July 5, 1932.  W. J. THOMPSON ET AL  1,866,237
LIQUID SOAP DISPENSER
Filed July 12, 1930

Inventors
William John Thompson and
Robert Gordon Kirkwood
By B. Singer, atty.

Patented July 5, 1932

1,866,237

UNITED STATES PATENT OFFICE

WILLIAM JOHN THOMPSON AND ROBERT GORDON KIRKWOOD, OF AUCKLAND, NEW ZEALAND

LIQUID SOAP DISPENSER

Application filed July 12, 1930, Serial No. 467,554, and in New Zealand March 28, 1930.

This invention relates to apparatus for dispensing liquids especially liquid soap in measured quantities of the type comprising a barrel or cylinder connected with a source of supply and containing a measuring chamber provided with a liquid inlet and outlet, a plunger or the like operable over the inlet and normally held clear of same by a spring; and a delivery valve connected with said outlet adapted to open under pressure created by movement of the plunger forcing out the contents in the measuring chamber.

With such known type of dispensing apparatus, the dispensing mechanism has heretofore been separated from the main liquid container which is positioned thereabove with the result that the liquid is fed to the said dispensing mechanism by gravity. Due to such gravity feed, it has been found that if there is the least leakage past the plunger, the actuating knob quickly becomes fouled by the escaping liquid. Furthermore with such present known type of apparatus, variation in the amount of the liquid dispensed at each operation cannot be made and there is no "air cushioning effect" which tends to give a desirable saponifying effect to the dispensed liquid when of the nature, for instance, of liquid soap.

Now according to the present invention, there are provided means for adjusting the amount of liquid dispensed at each operation, means for preventing leakage of the liquid past the plunger, and means for enabling a saponifying effect to be given to liquid soap or the like when such is the liquid being dispensed.

Furthermore according to the present invention the bulk container for the fluid may be combined in the one device with the dispensing mechanism thereby providing a complete and compact apparatus.

Broadly the invention comprises a container, a cylinder preferably integral therewith with lower orifices connecting the lower end of said cylinder to the said container, a plunger adapted to be reciprocated within, or a sleeve over said cylinder and normally held by spring means just above the intake of the measuring chamber of said cylinder, actuating means for operating said plunger or sleeve capable of adjustment to increase or decrease the length of stroke thereof, and an outlet at the bottom of said measuring chamber with means such as a check valve for preventing the escape of the liquid except when the plunger or sleeve is actuated.

Figure 1:
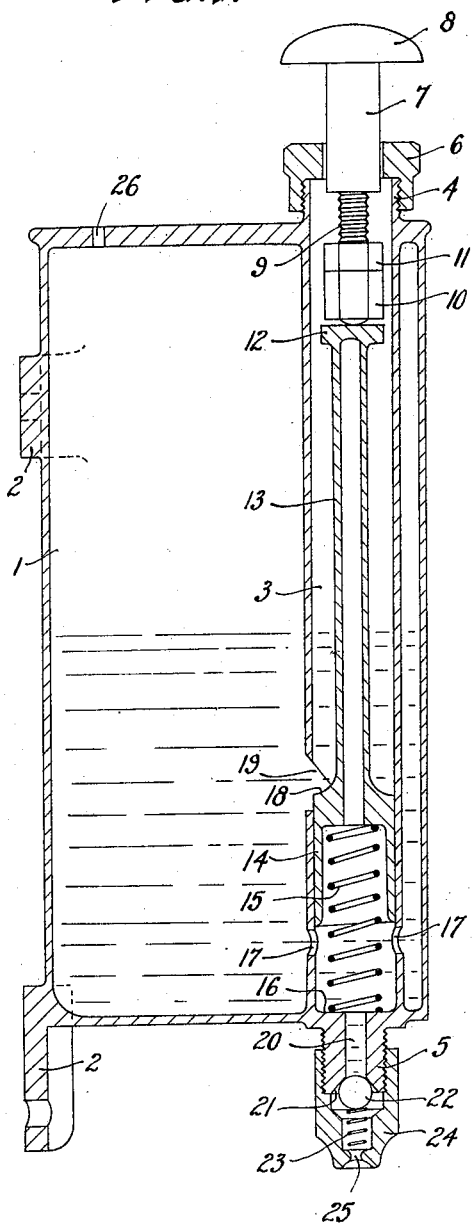
Figure 2:
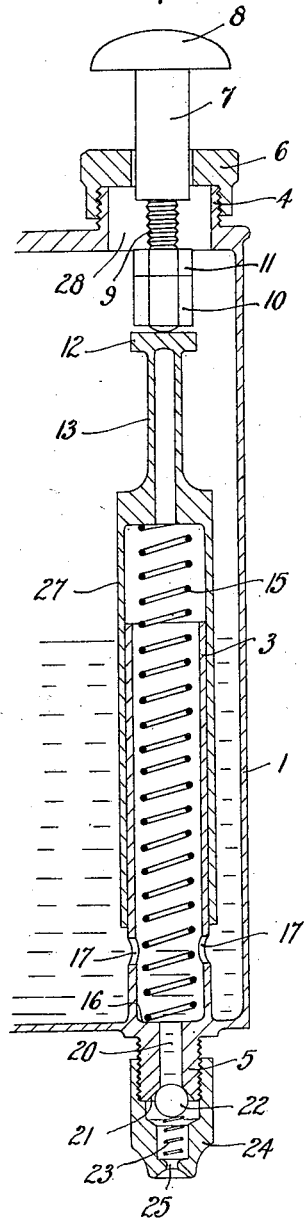

In describing the invention reference will be made in the accompanying drawing to two constructional embodiments of the invention in which Figure 1 shows a sectional elevation of the complete dispensing apparatus and Figure 2 shows a sectional elevation of alternative dispensing mechanism.

In the embodiment disclosed in Figure 1 of the drawing the invention comprises an enclosed container 1 preferably cylindrical in shape and having suitable mounting means 2 for securing same to a wall or the like.

The dispensing mechanism, which is integral with the container 1 comprises a vertical cylinder 3 passing through the said container 1 and having a threaded portion 4 above the top, and a threaded portion 5 below the bottom thereof.

To the threaded portion 4 a gland type nut 6 is fitted centrally through which passes an actuating member 7 with outer knob 8 and screwed lower portion 9 on which fits an adjustment nut 10 and lock nut 11.

The adjustment nut 10 rests on top of the blanked upper end 12 of a hollow plunger rod 13 which passes down to a hollow open bottomed plunger 14 neatly fitting into said cylinder 3, a compression spring 15 fitting between the bottom 16 of cylinder 3 and within the plunger 14 in such manner that in a relaxed state the said plunger 14 has its bottom edge directly above the lower orifices 17 in said cylinder 3, and its upper edge 18 below an upper container charging orifice 19 in said cylinder 3.

An outlet hole 20 passes from the cylinder bottom 16 to a seating 21 on which a ball valve 22 is adapted to be seated by the compression action of a compression spring 23 held by a nozzle fitting 24 fitted to the threaded portion 5, said nozzle fitting 24 having an outlet orifice 25.

An air vent hole 26 is provided in the top of container 1.

With the alternative mechanism illustrated in Figure 2 of the drawing it will be observed that the cylinder 3 does not pass through the top of container 1 but terminates about half way up same and in this case the blanked upper end 12 of hollow plunger rod 13 terminates at its lower end in a sleeve 27 which neatly fits over cylinder 3.

The threaded portion 4 surrounds a hole 28 at the top of the container 1 concentric with the cylinder 3.

In use and assuming the apparatus to be dispensing liquid soap which is the purpose for which the invention has been primarily devised, the container 1 is filled by unscrewing the gland type nut 6 and removing same along with the actuating member 7 and parts secured thereto.

In the apparatus as shown in Figure 1, this removal leaves the top of cylinder 3 open and the liquid soap is poured into the said cylinder 3 then passes around the upper blanked end 12 of plunger rod 13 and flows downwardly until it encounters the upper end 18 of the plunger 14. Due to said end 18 being below the orifice 19, the liquid must pass into the container 1 by way of said orifice, air displaced by same escaping by way of air vent 26.

The removal of gland type nut 6 and actuating member 7 and attached parts in the case of the apparatus as shown in Figure 2 leaves the hole 28 open and allows the liquid soap to be poured therethrough into container 1.

The container 1 having been filled and the actuating member 7 and nut 6 replaced, the apparatus is ready for use, and to discharge a fixed quantity of soap, the knob 8 is sharply struck.

Now due to the plunger 14 in Figure 1 or the sleeve 27 in Figure 2 being normally held above the orifices 17, the liquid soap will naturally flow into the bottom of the cylinder 3 through said orifices 17 so that by the striking of the knob 8 the plunger 14 (or the sleeve in Figure 2) will move downwardly and cover the orifices 17 with the result that the liquid soap is trapped and forced through hole 20 past ball valve 22 and out through outlet orifice 25.

As air is very compressible compared with liquid soap, the air within the hollow rod 13 and plunger 14 (or cylinder 3, sleeve 27 and hollow rod 13 in the case of Figure 2) will act as a cushion on the liquid soap at the bottom of cylinder 3, so that the depressing of the plunger 14 (or sleeve 27 in Figure 2) will compress the trapped air to a degree which will aid saponification of the liquid soap discharged from the orifice 25.

As the depressing of the plunger 14 (or sleeve 27) will increase the tension on spring 15 the latter tends to return the said plunger 14 (or sleeve 27) to the position as illustrated and as the knob 8 can only be depressed until it encounters the gland nut 6 this will determine the stroke of the plunger 14 (or sleeve 27) and incidentally the amount of the liquid dispensed at a time, but if it is desired to increase such amount, the adjusting nut 10 is screwed downwardly on the thread 9 and the lock nut 11 also screwed downwardly for locking purposes and this will cause the knob 8 to be raised with relation to the top of gland nut 6 so that the downward movement of said knob 8 before it encounters said nut 6 is increased and incidentally the stroke of the plunger 14 (or sleeve 27).

It will be noted that in the device shown in Figure 1, if there should happen to be any leakage past the plunger 14 when it is depressed, there would be no wastage as same would be returned to the container 1 by way of orifice 19 or orifices 17, and the possibility of leakage of the commodity by way of the nut 6 is negligible.

Claims:

1. A dispensing apparatus comprising a container having an air vent, a cylinder in the container having an inlet establishing communication between its lower portion and the container and having an outlet at its lower end provided with a normally closed valve, a hollow plunger in the cylinder operable over said inlet and a spring by which said plunger is normally held clear of the inlet and adapted to provide an air cushion, plunger operating means, and a removable cap closing the upper end of the cylinder and by which the plunger operating means is guided, the said cylinder also having an opening above the plunger to enable the container to be charged through the cylinder when the cap is removed.

2. A dispensing apparatus comprising a container having a cylinder therein communicating at its lower portion therewith and provided with a valved outlet, a tubular plunger arranged for vertical movement with respect to the cylinder, a spring to move the plunger upwardly, a removable cap on the container and operating means for the plunger guided by said cap and removable therewith.

In testimony whereof we have signed our names to this specification.

WILLIAM JOHN THOMPSON.
ROBERT GORDON KIRKWOOD.